United States Patent
Hansen et al.

(10) Patent No.: US 8,955,334 B2
(45) Date of Patent: Feb. 17, 2015

(54) SYSTEMS AND METHODS FOR CONTROLLING THE STARTUP OF A GAS TURBINE

(75) Inventors: Brian Patrick Hansen, Mauldin, SC (US); Christopher Edward LaMaster, Simpsonville, SC (US); Timothy Edward DeJoris, Mauldin, SC (US); David August Snider, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 1172 days.

(21) Appl. No.: 12/841,726

(22) Filed: Jul. 22, 2010

(65) Prior Publication Data

US 2012/0017602 A1 Jan. 26, 2012

(51) Int. Cl.
*F02C 7/22* (2006.01)
*F02C 7/26* (2006.01)
*F02C 9/00* (2006.01)
*F01D 19/00* (2006.01)

(52) U.S. Cl.
CPC ... *F02C 7/26* (2013.01); *F02C 9/00* (2013.01); *F05D 2260/85* (2013.01); *F01D 19/00* (2013.01)
USPC ............... 60/778; 60/772; 60/782; 60/788; 60/787; 60/785; 60/39.13

(58) Field of Classification Search
USPC ......... 60/782, 785, 795, 778, 787, 788, 39.13
See application file for complete search history.

(56) References Cited

U.S. PATENT DOCUMENTS

| | | | |
|---|---|---|---|
| 5,297,930 A | 3/1994 | Moore | |
| 5,586,857 A | 12/1996 | Ishii et al. | |
| 6,035,626 A * | 3/2000 | Wahl et al. | 60/773 |
| 6,328,526 B1 | 12/2001 | Seki et al. | |
| 6,701,717 B2 * | 3/2004 | Flatman et al. | 60/792 |
| 7,972,105 B2 * | 7/2011 | Dejoris et al. | 415/1 |
| 2003/0126864 A1 * | 7/2003 | Thompson | 60/788 |
| 2011/0259016 A1 * | 10/2011 | Winston et al. | 60/778 |

* cited by examiner

*Primary Examiner* — Craig Kim
(74) *Attorney, Agent, or Firm* — Sutherland Asbill & Brennan LLP

(57) ABSTRACT

Systems and methods for controlling the startup of a gas turbine are described. A gas discharge component may be configured to discharge gas from a compressor component associated with the gas turbine. A fuel control component may be configured to control a fuel flow provided to a combustor component associated with the gas turbine. A drive component may be configured to supply a rotational force to a shaft associated with the gas turbine. At least one control device may be configured to (i) direct the gas discharge component to discharge gas from the compressor component, (ii) direct the fuel control component to adjust the fuel flow, and (iii) direct the drive component to rotate the shaft.

20 Claims, 2 Drawing Sheets

SYSTEMS AND METHODS FOR CONTROLLING THE STARTUP OF A GAS TURBINE

FIELD OF THE INVENTION

Embodiments of the invention relate generally to gas turbines and more specifically to controlling the startup of a gas turbine.

BACKGROUND OF THE INVENTION

Rotating stall is a phenomenon that can lead to mechanical stresses and damage within an axial-flow machine, such as a compressor of a gas turbine. During the startup of a turbine, rotating stall can occur in a compressor due to compressor operation outside of the standard operating conditions for the compressor. Flow separation from the blades may often persist over a wide range of speeds within the compressor. In certain circumstances, a frequency associated with the rotating stall may be similar to a natural resonant frequency of the compressor blades, thereby leading to resonance, relatively high mechanical stresses, and a greater risk of damage within the compressor.

In conventional turbine control systems, a startup sequence typically involves providing a relatively large gas flow to a compressor while simultaneously providing a relatively large fuel flow to a combustor of the turbine. In other words, these conventional systems attempt to bring the turbine to a steady state operating condition by maximizing the air flow to a compressor and the fuel flow to a combustor. However, as mentioned above, these conventional systems can lead to operation outside of the standard operating conditions for the compressor and, mechanical stresses due to rotating stall. Accordingly, improved systems and methods for controlling the startup of a gas turbine are desirable.

BRIEF DESCRIPTION OF THE INVENTION

Some or all of the above needs and/or problems may be addressed by certain embodiments of the invention. Embodiments of the invention may include systems and methods for controlling the startup of a gas turbine. According to one embodiment of the invention, there is disclosed a system for controlling the startup of a gas turbine. The system may include a gas discharge component, a fuel control component, a drive component, and at least one control device. The gas discharge component may be configured to discharge gas from a compressor component associated with the gas turbine. The fuel control component may be configured to control a fuel flow provided to a combustor component associated with the gas turbine. The drive component may be configured to supply a rotational force to a shaft associated with the gas turbine. The at least one control device may be configured to (i) direct the gas discharge component to discharge gas from the compressor component, (ii) direct the fuel control component to adjust the fuel flow to a value associated with a reduced operating line for the compressor component, and (iii) direct the drive component to rotate the shaft.

According to another embodiment of the invention, there is disclosed a method for controlling the startup of a gas turbine. A discharge of gas, such as air, from a compressor component associated with the gas turbine may be directed. Additionally, an adjustment of a fuel flow provided to a combustor component associated with the gas turbine may be directed such that the fuel flow is adjusted to a value associated with a reduced operating line for the compressor component. A drive component may additionally be directed to supply a rotational force to a shaft associated with the gas turbine. In certain embodiments, the operation of the method may be performed by one or more computing devices associated with one or more control devices.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
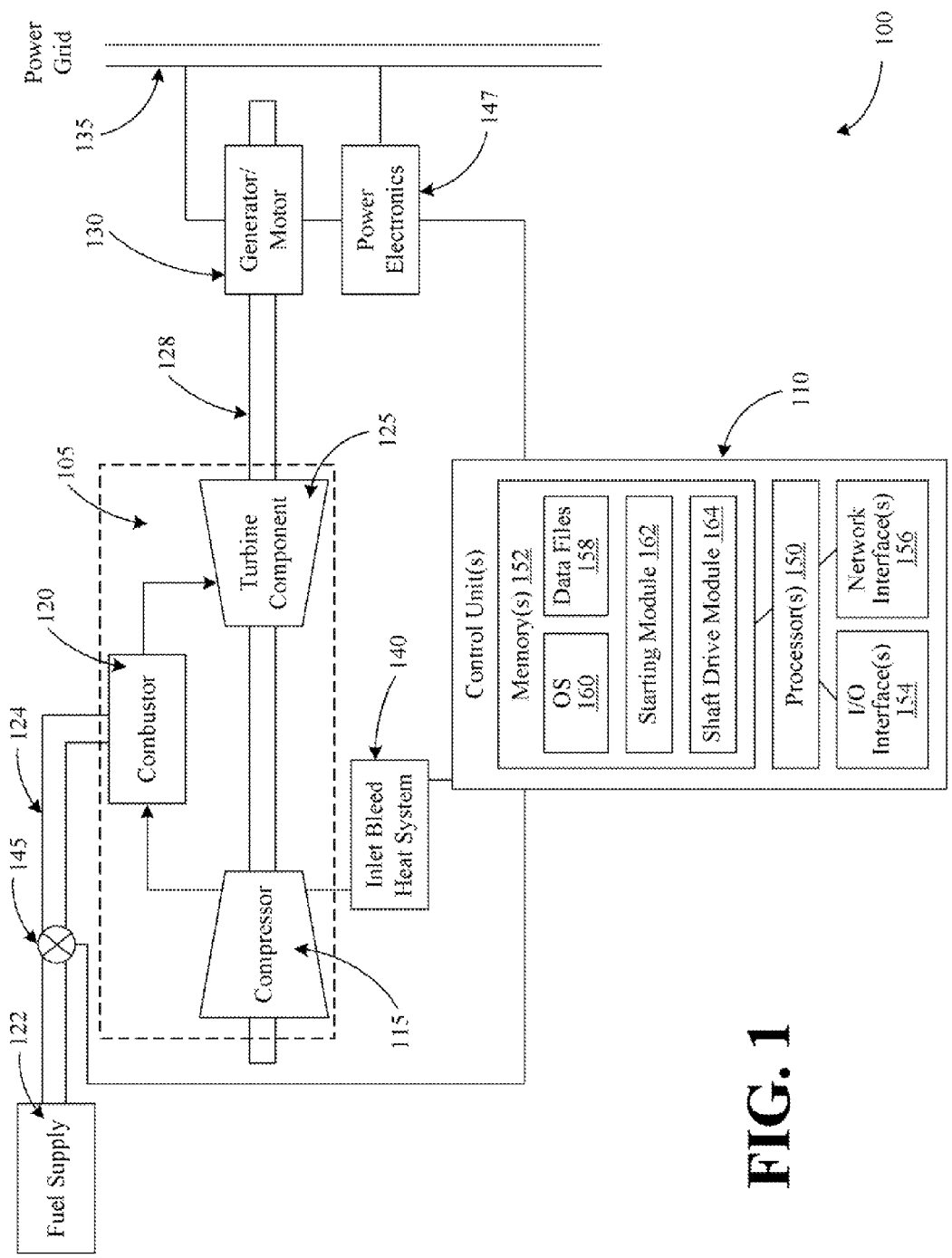

Having thus described the invention in general terms, reference will now be made to the accompanying drawings, which are not necessarily drawn to scale, and wherein:

FIG. 1 is a block diagram of one example system that may be utilized to control the startup of a gas turbine, according to an illustrative embodiment of the invention.

Figure 2:
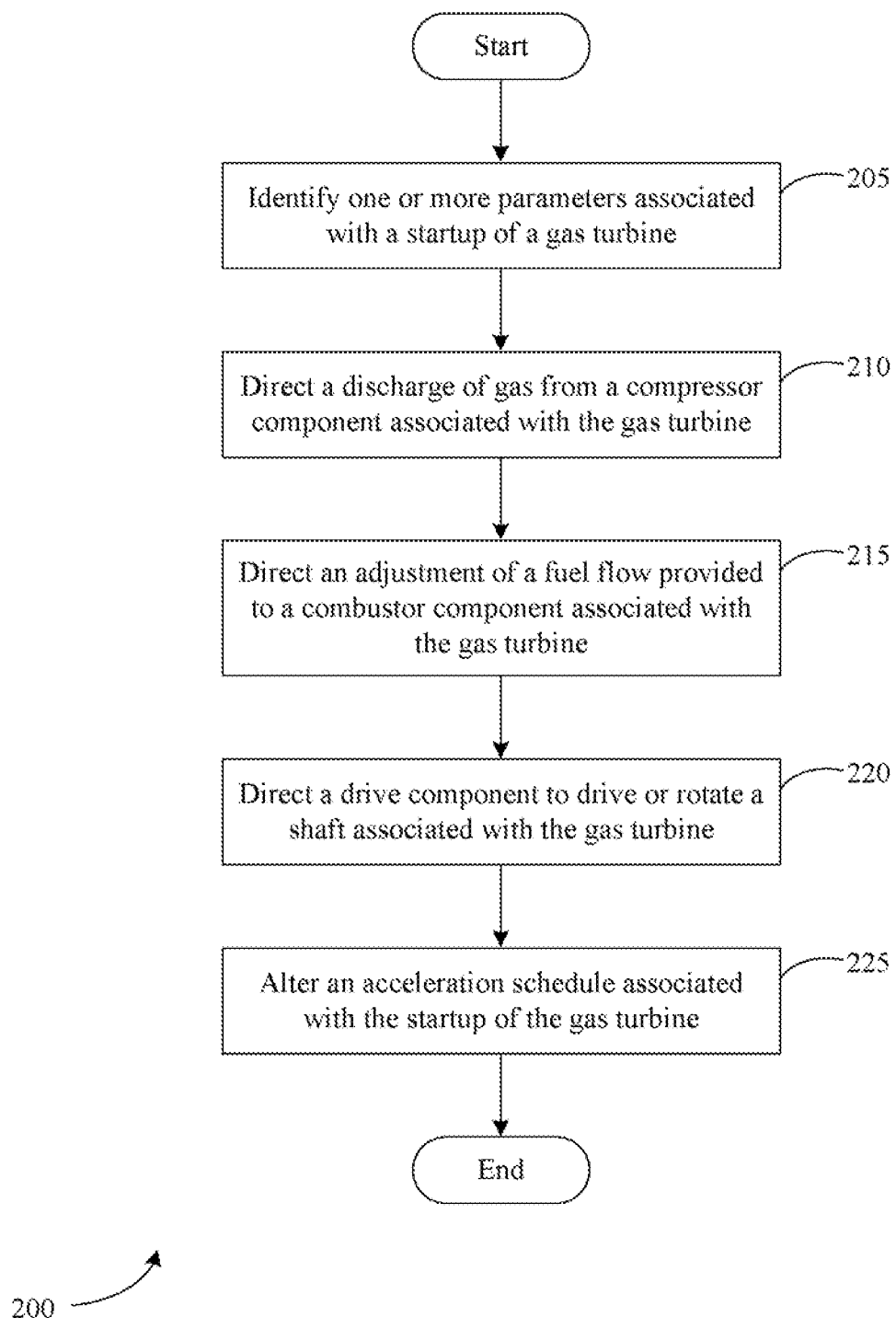

FIG. 2 is a flow diagram of one example method for controlling the startup of a gas turbine, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems and methods for controlling the startup of a gas turbine. According to an example embodiment of the invention, a gas turbine controller may manipulate compressor mass flow and/or combustor fuel flow in order to reduce rotating stall within the gas turbine. For example, an operating line of a compressor component associated with the gas turbine may be shifted during at least a portion of the startup sequence of the gas turbine. For purposes of the disclosure, the term "operating line" refers to a compressor pressure ratio ("CPR") over various rotational speeds within a compressor. As a result of shifting an operating line, rotating stall associated with the compressor may be reduced and/or shifted or moved to a velocity or speed range in which its frequency is not concurrent with the natural frequencies of various compressor components. For example, gas that is provided to the compressor may be discharged from the compressor by a suitable gas discharge component. Alternatively, a reduced amount of gas may be provided to the compressor component. Additionally, a fuel flow that is provided to a combustor component or combustor section of the gas turbine may be adjusted or reduced from a conventional fuel flow amount for turbine startup to a fuel flow associated with a reduced operating line for the compressor component. Alternatively, fuel flow may be set to a fuel flow that is lower than a fuel flow for a conventional turbine startup or other predetermined value. As another alternative, fuel flow may be minimized. As a result of shifting and/or minimizing the operating line of the compressor component during startup, the mechanical stresses within the compressor component, such as stresses on the compressor blades, may be minimized and/or reduced, thereby contributing to lower maintenance costs.

Additionally, in certain embodiments of the invention, at least one drive component may be utilized to provide a rotational force or torque to a shaft associated with the gas turbine. In this regard, a reduction of torque resulting from the gas discharge and/or the reduction or minimization of fuel flow may be at least partially compensated for during the startup of the turbine. A wide variety of different types of drive components may be utilized as desired in various embodiments of the invention, such as a motor or a generator that receives power via a load commutated inverter.

According to an aspect of the invention, at least one control device may be configured to direct the discharge of gas, the reduction in fuel flow, and/or the application of a rotational force to the shaft by the drive component. For example, a control device may be configured to control the startup of a gas turbine based upon a fixed startup schedule. As another example, a control device may be configured to identify a desired operating line for a compressor component, and control the startup of the gas turbine based upon the desired operating line. As yet another example, a control device may be configured to dynamically monitor various startup conditions associated with the gas turbine, such as an amount of gas that is discharged and/or a fuel flow that is provided to the combustor. In doing so, the control device may be in communication with and receive measurements data from any number of suitable sensors and/or measurement devices. Based upon the monitoring and/or determination of startup conditions and parameters, the control device may determine or calculate a desired torque to be supplied by the drive component.

Various embodiments of the invention may include one or more special purpose computers, systems, and/or particular machines that facilitate the control of the startup of a gas turbine. A special purpose computer or particular machine may include a wide variety of different software modules and/or applications as desired in various embodiments. As explained in greater detail below, in certain embodiments, these various software components may be utilized to initiate and/or control a startup sequence for a gas turbine in a manner that reduces the impact of rotating stall.

Certain embodiments of the invention described herein may have the technical effect of facilitating the startup of a gas turbine. Additionally, certain embodiments of the invention may have the technical effect of shifting an operating line of a compressor and/or a rotating stall window of the compressor during the startup of a gas turbine. In this regard, the mechanical stresses on the components of the compressor, such as the compressor blades, may be reduced and/or minimized.

FIG. 1 is a schematic diagram of one example system 100 that may be utilized to control the startup of a gas turbine, according to an illustrative embodiment of the invention. The system 100 may include a suitable gas turbine 105 and one or more control devices or control units 110 that are configured to control the startup of the gas turbine 105. The gas turbine 105 may include a compressor component 115 ("compressor"), a combustor component 120 ("combustor"), and a turbine component 125. As desired, the turbine component 125 may be referred to as the turbine 125.

The compressor 115 may be a suitable device that increases the pressure of a gas, such as air, by adding energy through tangential momentum. In certain embodiments, the compressor 115 may be an axial-flow compressor, although other types of compressors may be utilized as desired in various embodiments. Additionally, in certain embodiments, the compressor 115 may be a multistage compressor. In operation, the compressor 115 may compress a gas (e.g., air), and the compressor 115 may supply the compressed gas to the combustor 120. The combustor 120 may receive the relatively high pressure compressed gas from the compressor 115 and mix the gas with fuel that is received from any number of fuel supplies 122 via any number of suitable fuel flow channels 124, such as fuel flow pipes. The mixed gas and fuel may then be ignited by the combustor 120, and the expanding hot gases may be supplied to any number of stages associated with the turbine component 125 via any number of suitable nozzles. In this regard, the expanding hot gases may drive the turbine component 125. As illustrated, the compressor component 115 and the turbine component 125 may operate on a common rotor shaft 128 which may also be connected to a generator/motor 130 downstream of the turbine component 125. Rotation of the rotor shaft 128 by the turbine component 125 may result in the generation of power via the generator/motor 130. As desired, the generated power may be supplied by the generator/motor 130 to a suitable power line and/or to a power grid via any number of suitable transformers and/or other power devices.

With continued reference to FIG. 1, at least one gas discharge component, such as the illustrated inlet bleed heat system 140, may be provided. The gas discharge component may facilitate the discharge of gas from the compressor 115, thereby contributing to an increase in the volume of the gas that is provided to the combustor 120. For example, the inlet bleed heat system 140 may be configured to bleed compressed gas from any number of stages associated with the compressor 115. In this regard, the back pressure on the compressor 115 from the combustor 120 may be lowered. Additionally, the compressor mass gas flow may be effectively lowered or reduced. The reduction in back pressure may facilitate the shifting or lowering of an operating line associated with the compressor 115. Additionally, the reduction in back pressure may facilitate a shifting in the rotating stall window of the compressor from an undesirable range to a safe or desirable range.

Additionally, one or more fuel control components may be provided in association with the system 100. The fuel control components may be configured to control a fuel flow that is provided to the combustor 120. A wide variety of different types of fuel control components may be utilized as desired in various embodiments, such as one or more valves 145 that may be positioned in a closed, opened, and/or any number of partially opened positions. In certain embodiments, the positioning of the valves 145 may be controlled by the one or more control units 110. During the startup of the gas turbine 105, the fuel control components may be positioned or otherwise configured to adjust the fuel flow to the combustor to a fuel flow associated with a reduced operating line associated with the compressor 115. For example, the fuel control components may be positioned to provide a reduced or relatively reduced fuel flow to the combustor 120. As one example, the fuel flow may be reduced relative to a fuel flow associated with conventional gas turbine startup techniques. As another example, the fuel flow may be set to a value that is relatively lower than a predetermined or expected value, such as a fuel flow associated with conventional gas turbine startup techniques. The reduction, adjustment, or setting of fuel flow may reduce the compressor discharge pressure and further contribute to the shifting of an operating line and/or rotating stall window associated with the compressor 115. In certain embodiments, the fuel flow may be reduced or set in a manner that maintains a sufficient margin to lean blow out. As desired, the margin may be determined utilizing any number of testing procedures, models, and/or monitoring procedures. Additionally, in certain embodiments, the fuel flow may be minimized to a relatively low fuel flow amount that still permits startup of the gas turbine 105.

As set forth above, during the startup of a turbine, an operating line of a compressor 115 may be lowered and/or a rotating stall window of the compressor 115 may be shifted by reducing the back pressure on the compressor 115 from the combustor 120 and/or by adjusting a fuel flow that is provided to a combustor 120. The lowering or reduction of the operating line results in a reduction of compressor discharge pressure, which may result in a reduction of shaft 128 torque. In order to compensate for this reduction and maintain an acceleration of the turbine component 125 during startup, one or more drive components and/or drive mechanisms may be utilized to drive the shaft 128 during startup. For example, a drive component may provide a rotational force and/or torque to the shaft 128 in order to rotate the shaft during the startup of the turbine component 125. A wide variety of different types of generators/motors 130 may be utilized as desired in various embodiments of the invention. For example, at least one motor may be connected to the shaft 128 and configured to supply a rotational force to the shaft. A wide variety of suitable types of motors may be utilized, such as any suitable alternating current ("AC") and/or direct current ("DC") motors. As desired, a motor may receive power from a suitable power source, such as the power grid 135 and utilize the received power to rotate or drive the shaft 128.

Another example of a suitable drive mechanism is a generator/motor 130 that receives power from a power source, such as the power grid 135, via any number of suitable power electronics 147, such as a suitable load commutated inverter ("LCI"). During the normal operation of the gas turbine 105, the generator/motor 130 may be utilized to generate power that is supplied to the power grid 135. However, during the startup of the turbine, the power electronics 147 may facilitate the provision of power from the power grid 135 to the generator/motor 130, and the generator/motor 130 may provide a rotational force and/or torque to the shaft 128 in order to assist in the startup and acceleration of the turbine component 125.

Additionally, in certain embodiments of the invention, any number of sensors, sensing devices, and/or measurement devices may be provided. The sensors may be configured to monitor and/or measure a wide variety of operating conditions and/or operating parameters associated with the gas turbine 105. The measurements may then be provided to the control unit 110 and utilized by the control unit 110 during the startup of the gas turbine 105. For example, various sensors may measure a fuel flow that is provided to the combustor 120, a rotational velocity of the shaft 128, a pressure within the compressor 115, one or more flows of gas that are discharged from the compressor 115, and/or any other number of parameters. The control unit 110 may utilize the various measurements in order to determine one or more of, a desired gas discharge during startup, a desired fuel flow, and/or a desired amount of rotational force to be supplied to the shaft 128. In certain embodiments, the control unit 110 may dynamically monitor various operating parameters during startup and dynamically control the startup of the gas turbine 105.

With continued reference to FIG. 1, the system 100 may include one or more control units 110 or control devices. In certain embodiments, the control unit 110 may be a central controller associated with a power plant and/or a power generation system. Some examples of suitable controllers are a Mark™ VI control system and a Mark™ VIe control system produced by the General Electric Company. According to an aspect of the invention, the control unit 110 may be configured to control the startup of the gas turbine 105, the monitoring of the gas turbine 105, and/or the operation of the gas turbine 105. In certain embodiments, the control unit 110 may control the operations of other components of the system 100. For example, the control unit 110 may direct the inlet bleed heat system 140 or other gas discharge component to discharge gas from the compressor 115; the control unit 110 may control the positioning of the valves 145 and/or direct a fuel control component to adjust, reduce, and/or minimize a fuel flow that is provided to the combustor 120; and the control unit 110 may direct the drive component (e.g., the generator/motor 130) to provide a rotational force to the shaft 128. As desired, control of various components of the system 100 may be distributed among several control units. For example, a first control unit may monitor and/or control the startup of the gas turbine 105, and a second control unit may control the operations of the LCI components and/or power electronics 147 associated with the generator/motor 130. As desired, multiple control units may be in communication with one another via any number of suitable networks, such as a local area network, wide area network, cellular network, wireless network, etc.

The control unit 110 may include any number of suitable processor driven devices. For example, the control unit 110 may include any number of special purpose computers or particular machines, application-specific circuits, programmable logic controllers ("PLC"), microcontrollers, personal computers, minicomputers, mainframe computers, supercomputers, and the like. In certain embodiments, the operations of the control unit 110 may be controlled by computer-executed or computer-implemented instructions that are executed by one or more processors associated with the control unit 110. The instructions may be embodied in one or more software components as desired in various embodiments of the invention. The execution of the instructions may form a special purpose computer or other particular machine that is operable to control the startup of the gas turbine 105. The one or more processors that control the operations of the control unit 110 may be incorporated into the control unit 110 and/or in communication with the control unit 110 via one or more suitable networks.

The control unit 110 may include one or more processors 150, one or more memory devices 152, one or more input/output ("I/O") interfaces 154, and/or one or more network interface device(s) 156. The one or more memory devices 152 may be any suitable memory devices, for example, caches, read-only memory devices, random access memory devices, magnetic storage devices, etc. The one or more memory devices 152 may store data, executable instructions, and/or various program modules utilized by the control unit 110, for example, data files 158 associated with the operation of the gas turbine 105 and/or other components of the system 100, an operating system ("OS") 160, a starting or startup module 162, and a shaft drive module 164. The data files 158 may include any suitable data associated with the operation of and/or startup of the gas turbine 105, such as various measurements data associated with the gas turbine 105 and/or other components of the system 100, one or more parameters and/or conditions associated with the startup of the gas turbine 105, a desired operating line associated with the compressor 115, information associated with a startup schedule, etc. The OS 160 may include executable instructions and/or program modules that facilitate and/or control the general operation of the control unit 110. For example, the OS 160 may facilitate the execution of other software programs and/or program modules by the processors 150.

The starting module 162 may be configured to control the startup or a startup sequence of the gas turbine 105. According to an aspect of the invention, the starting module 162 may control the startup such that an operating line of the compressor 115 is lowered, thereby shifting a rotating stall window associated with the compressor 115. As a result of shifting the rotating stall window, the mechanical stresses applied to the components of the compressor 115 (e.g., the compressor blades) may be reduced, thereby resulting in reduced wear and improved life cycle of the compressor components. In order to lower the operating line of the compressor 115, the starting module 162 may direct the discharge component (e.g., the inlet bleed heat system 140) to discharge gas from the compressor 115 and/or the starting module 162 may direct the fuel control component (e.g., valves 145) to adjust, reduce, set, and/or minimize the fuel flow that is supplied to the combustor 120. Additionally, in certain embodiments, the starting module 162 may direct the drive component to provide a rotational force to the shaft 128 in order to compensate for the lower operating line of the compressor 115 during startup.

A wide variety of suitable techniques and/or algorithms may be utilized as desired by the starting module 162 to control the startup of the gas turbine 105. For example, in certain embodiments, the starting module 162 may control the startup of the gas turbine 105 in accordance with a fixed startup schedule. The fixed schedule may specify one or more startup parameters, such as desired fuel flows, desired gas mass flows and/or gas discharges, desired rotational force to be supplied by the drive component, timing associated with the startup of the gas turbine 105, and/or a desired acceleration rate of the turbine component 125. In this regard, the fixed schedule may result in lowering the operating line of the compressor 115 during at least a portion of the startup sequence of the gas turbine 105. Additionally, the fixed schedule may result in shifting the rotating stall window of the compressor 115 during at least a portion of the startup sequence of the gas turbine 105. In certain embodiments, the rotating stall window may be shifted during the entire startup sequence of the gas turbine 105. In other embodiments, the rotating stall window may be shifted during a portion of a startup sequence, such as a portion of the startup sequence that may typically result in relatively high mechanical stresses and/or damage to the compressor components. The starting module 162 may obtain the fixed schedule from memory 152 and/or from an external system or data source, and the starting module 162 may utilize the fixed schedule to control the startup of the gas turbine 105.

Another example technique for controlling the startup of the gas turbine 105 involves the starting module 162 obtaining a desired operating line for the compressor 115. In certain embodiments, the operating line may be determined utilizing a suitable modeling component that models the operations of the gas turbine 105, and the operating line may be provided to the starting module 162. As desired, the operating line may represent a minimum operating line for the compressor 115 during the startup of the gas turbine 105, although other desired operating lines may be utilized. Once the starting module 162 obtains the desired operating line, the starting module 162 may utilize the desired operating line to calculate and/or determine various starting conditions for the gas turbine, such as desired fuel flow to the combustor 120, desired gas mass flow within the compressor 115, desired gas discharge from the compressor 115, and/or a desired rotational force to be supplied to the shaft 128 by the drive component. The starting module 162 may then control the startup of the gas turbine 105 based at least in part on the desired operating line and/or the starting conditions that are determined utilizing the desired operating line.

Yet another example technique for controlling the startup of the gas turbine 105 involves the starting module 162 dynamically monitoring one or more starting conditions associated with the gas turbine 105 and dynamically calculating one or more of a desired gas mass flow to be supplied to the combustor 120, a desired gas discharge from the compressor 115, and/or a desired rotational force to be supplied to the shaft 128. For example, the starting module 162 may receive measurements data associated with the gas mass flow within the compressor 115 and/or the fuel flow that is supplied to the combustor 120. The starting module 162 may then dynamically direct the adjustment of the fuel flow and/or the discharge of gas from the compressor 115 based upon the received measurements. In this regard, the starting module 162 may maintain desired operating conditions and/or a desired operating line associated with the compressor 115. Additionally, the starting module 162 may dynamically calculate and/or determine a desired amount of rotational force that needs to be supplied to the shaft 128 by the drive component in order to achieve a minimum or desired acceleration of the turbine component 125 during startup. The starting module 162 may then direct the drive component and/or a drive component controller based upon the calculations.

In certain embodiments of the invention, the starting module 162 may further be configured to alter and/or suppress other control modules associated with the gas turbine 105. For example, the starting module 162 may alter and/or suppress a conventional acceleration schedule for a schedule that may attempt to maximize the flow of air and fuel to the turbine components during a startup sequence. In this regard, the starting module 162 may alter or suppress other components of a turbine control system that may attempt to increase or drive a relatively higher operating line for the compressor 115.

The shaft drive module 164 may be configured to control the operation of the drive component. As desired in certain embodiments, the shaft drive module 164 may be incorporated into the starting module 162 or executed by a separate control unit. In embodiments of the invention in which a generator/motor 130 is utilized to drive the shaft 128, the shaft drive module 164 may include a suitable LCI scheduling component that is configured to control the provision of power from the power grid 135 or another power source to the generator/motor 130 via any number of suitable power electronics 147, such as suitable LCI components. Similar operations may be utilized by the shaft drive module 164 to control the provision of power to a motor or other suitable drive component. In this regard, the shaft drive module 164 may direct the drive component to apply a rotational force and/or torque to the shaft 128 during the startup of the gas turbine 105. The additional torque supplied by the drive component may compensate for at least a portion of the losses that are attributable to the lower operating line of the compressor 115.

With continued reference to FIG. 1, the network interfaces 156 may facilitate connection of the control unit 110 to any number of suitable networks, such as a local area network, a wide area network, the Internet, a radio frequency ("RF") network, a Bluetooth™ enabled network (trademark owned by BLUETOOTH SIG, INC.), any suitable wired network, any suitable wireless network, or any suitable combination of wired and wireless networks. In this regard, the control unit 110 may communicate with other components of the system 100 and/or with external devices or systems. The I/O interfaces 154 may facilitate communication between the control unit 110 and one or more input/output devices, for example, one or more user interface devices, such as a display, keypad, control panel, touch screen display, remote control; microphone, etc., that facilitate user interaction with the control unit 110.

As desired, embodiments of the invention may include a system 100 with more or less than the components illustrated in FIG. 1. The system 100 of FIG. 1 is provided by way of example only.

FIG. 2 is a flow diagram of one example method 200 for controlling the startup of a gas turbine, such as the gas turbine 105 illustrated in FIG. 1. The method 200 may be performed by a suitable control unit associated with the gas turbine 105, such as the control unit 110 illustrated in FIG. 1. The method 200 may begin at block 205.

At block 205, one or more parameters associated with the startup of the gas turbine 105 may be identified and/or obtained. A wide variety of startup parameters may be identified as desired in various embodiments of the invention. For example, in certain embodiments, a fixed startup schedule for the gas turbine 105 that functions to lower the operating line of the gas turbine 105 and/or shift a rotating stall window during at least a portion of a startup sequence may be identified. In other embodiments, a desired operating line for the compressor 115 during startup may be identified. In yet other embodiments, various timing parameters (e.g., time windows) and/or rotational velocity parameters at which a rotating stall window should be shifted may be identified. For example, parameters that identify a window during the startup of the gas turbine at which the rotating stall window should be shifted may be identified. In yet other embodiments, desired minimum and/or maximum operating parameters of the gas turbine 105 during a startup sequence may be identified, such as a minimum acceleration, a desired fuel to gas ratio for the combustor 120, etc. As desired, the identified one or more parameters may be utilized to control the startup of the gas turbine 105.

At block 210, a discharge of gas from the compressor 115 may be directed. For example, an inlet bleed heat system or other suitable gas discharge component may be directed to discharge gas from the compressor 115 associated with the gas turbine 105. Additionally, at block 215, a reduction or minimization of a fuel flow provided to the combustor 120 may be directed. For example, the positions of one or more valves, such as the valves 145 illustrated in FIG. 1, may be controlled to adjust, set, reduce, and/or minimize the fuel flow that is provided to the combustor 120. The discharge of gas and the adjustment or minimization in fuel flow may result in a lowering of the operating line of the compressor 115 during at least a portion of the startup sequence of the gas turbine 105. Additionally, the discharge of gas and the adjustment or minimization of fuel flow may result in a shifting of the rotating stall window of the compressor 115 during at least a portion of the startup sequence. As desired, the direction of the gas discharge and the direction of an adjustment, reduction, or minimization fuel flow may be based at least in part on one or more of the parameters identified at block 205. For example, a fixed startup schedule may be consulted and utilized to direct the gas discharge and/or the fuel flow reduction or minimization. As another example, a desired operating line may be utilized to determine a desired fuel flow and/or gas mass flow rate, and the directions of the gas discharge and/or the fuel flow reduction or minimization may be based at least in part on the determinations. As yet another example, a gas mass flow rate and/or fuel flow may be monitored and dynamically adjusted.

At block 220, a drive component may be directed to drive or rotate a shaft associated with the gas turbine 105, such as the shaft 128 illustrated in FIG. 1. A wide variety of devices may be utilized as a drive component as desired in various embodiments of the invention, such as a motor and/or a generator that is powered by a LCI. The drive component may provide a rotational force and/or torque to the shaft 128 in order to at least partially compensate for the lowered operating line of the compressor 115. In this regard, a desired acceleration, such as a minimum startup acceleration, of the turbine component 125 of the gas turbine 105 may be achieved and/or maintained. As desired, the direction of the drive component may be based at least in part on one or more of the parameters identified at block 205, such as a fixed startup schedule. Additionally, in certain embodiments, a desired rotational velocity of the shaft 128 and/or a desired torque to be applied by the drive component may be calculated or determined based upon various measurements data associated with the gas turbine 105 or based upon the fuel flow and/or gas mass flow. In certain embodiments, a desired rotational velocity may be dynamically determined during the startup of the gas turbine 105. The drive component may then be directed based upon a calculated or determined rotational velocity.

At block 225, which may be optional in certain embodiments of the invention, the operation of one or more other components of a gas turbine control system may be altered and/or suppressed during the startup of the gas turbine 105. In this regard, components of the control system that may operate independently of the method 200 described herein may be prevented from increasing the operating line of the compressor 115. A wide variety of other components may be altered and/or suppressed as desired in various embodiments of the invention. For example, an acceleration schedule associated with gas turbine startup may be altered.

The method 200 may end following block 225.

The operations described in the method 200 of FIG. 2 do not necessarily have to be performed in the order set forth in FIG. 2, but instead may be performed in any suitable order. Additionally, in certain embodiments of the invention, more or less than all of the elements or operations set forth in FIG. 2 may be performed.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for controlling the startup of a gas turbine, the system comprising:
   a gas discharge component configured to discharge gas from a compressor component associated with the gas turbine;
   a fuel control component configured to control a fuel flow provided to a combustor component associated with the gas turbine;
   a drive component configured to supply a rotational force to a shaft associated with the gas turbine; and
   at least one control device configured to (i) direct the gas discharge component to discharge gas from the compressor component to reduce a compressor pressure ratio associated with the compressor component, (ii) direct the fuel control component to adjust the fuel flow to a value associated with the reduced compressor pressure ratio, and (iii) dynamically direct the at least one motor to provide an increased rotational force to the shaft in response to the reduced compressor pressure ratio induced by the gas discharge component after ignition of the fuel flow.

2. The system of claim 1, wherein the at least one control device directs at least one of the gas discharge component, the fuel control component, or the drive component based upon a fixed schedule associated with the startup of the gas turbine.

3. The system of claim 1, wherein the at least one control device is further configured to identify a desired operating line associated with the compressor component, and wherein the at least one control device directs at least one of the gas discharge component, the fuel control component, or the drive component based upon the identified desired operating line.

4. The system of claim 1, wherein the at least one control device is further configured to calculate, based at least in part on one or more of (i) an amount of gas discharged by the gas discharge component or (ii) the fuel flow provided to the combustor component, a desired torque to be supplied by the drive component, and
   wherein the at least one control device directs the drive component based upon the calculation of the desired torque.

5. The system of claim 1, wherein the at least one control device is further configured to identify one or more parameters associated with the startup of the gas turbine, and
   wherein the at least one control device directs at least one of the gas discharge component, the fuel control component, or the drive component based upon the identified one or more parameters.

6. The system of claim 5, wherein the one or more parameters comprise at least one of (i) a time during the startup of the gas turbine at which a rotating stall window associated with the compressor component should be shifted, (ii) a rotational velocity of the shaft during the startup of the gas turbine at which the rotating stall window associated with the compressor component should be shifted, or (iii) a desired fuel to gas ratio for the combustor component.

7. The system of claim 1, wherein the at least one control device directs at least one of the gas discharge component, the fuel control component, or the drive component during a portion of a startup sequence for the gas turbine.

8. The system of claim 1, wherein the discharge of gas and the adjustment in fuel flow shifts a rotating stall window associated with the compressor component.

9. The system of claim 1, wherein the at least one control device is further configured to alter an acceleration schedule associated with the startup of the gas turbine.

10. The system of claim 1, wherein the drive component comprises one of (i) a motor or (ii) a generator that receives power via a load commutated inverter.

11. A method for controlling the startup of a gas turbine, the method comprising:
   directing a discharge of gas from a compressor component associated with the gas turbine thereby reducing a compressor pressure ratio associated with the compressor component;
   directing an adjustment of a fuel flow provided to the combustor component associated with the gas turbine to a value associated with the reduced compressor pressure ratio, and
   dynamically directing the at least one motor to provide an increased rotational force to a shaft in response to the reduced compressor pressure ratio induced by the gas discharge component after ignition of the fuel flow, wherein the above operations are performed by one or more computing devices associated with one or more control devices.

12. The method of claim 11, wherein at least one of directing the discharge of gas, directing the adjustment of the fuel flow, or directing a drive component to supply a rotation force comprises directing based upon a fixed schedule associated with the startup of the gas turbine.

13. The method of claim 11, further comprising:
identifying, by the one or more computing devices, a desired operating line associated with the compressor component,
wherein at least one of directing the discharge of gas, directing the adjustment of the fuel flow, or directing the drive component is based upon the identified desired operating line.

14. The method of claim 11, further comprising:
calculating, by the one or more computing devices based at least in part on one or more of (i) an amount of discharged gas or (ii) the fuel flow provided to the combustor component, a desired torque to be supplied by the drive component,
wherein directing the drive component comprises directing the drive component based upon the calculated desired torque.

15. The method of claim 11, further comprising:
identifying, by the one or more computing devices, one or more parameters associated with the startup of the gas turbine,
wherein at least one of directing the discharge of gas, directing the adjustment of the fuel flow, or directing the drive component is based upon the identified one or more parameters.

16. The method of claim 15, wherein identifying one or more parameters comprises identifying at least one of (i) a time during the startup of the gas turbine at which a rotating stall window associated with the compressor component should be shifted, (ii) a rotational velocity of the shaft during the startup of the gas turbine at which the rotating stall window associated with the compressor component should be shifted, or (iii) a desired fuel to gas ratio for the combustor component.

17. The method of claim 11, wherein at least one of directing the discharge of gas, directing the adjustment of the fuel flow, or directing the drive component to supply a rotational force comprises directing during a portion of the startup sequence for the gas turbine.

18. The method of claim 11, wherein directing the discharge of gas and directing the adjustment of the fuel flow shifts a rotating stall window associated with the compressor component.

19. The method of claim 11, further comprising:
altering, by the one or more computing devices, an acceleration schedule associated with the startup of the gas turbine.

20. The method of claim 11, wherein directing the drive component comprises directing one of (i) a motor or (ii) a generator that receives power via a load commutated inverter.

* * * * *